US011618330B1

(12) United States Patent
Hau et al.

(10) Patent No.: US 11,618,330 B1
(45) Date of Patent: Apr. 4, 2023

(54) SYSTEM AND METHOD FOR AUTONOMOUSLY CHARGING ELECTRIC VEHICLES

(71) Applicant: GM Cruise Holdings LLC, San Francisco, CA (US)

(72) Inventors: Darren Hau, Menlo Park, CA (US); Vincent P. Kee, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 0 days.

(21) Appl. No.: 17/494,529

(22) Filed: Oct. 5, 2021

Related U.S. Application Data

(63) Continuation of application No. 17/494,398, filed on Oct. 5, 2021.

(51) Int. Cl.
*B60L 53/36* (2019.01)
*B60L 53/30* (2019.01)
*G05D 1/02* (2020.01)

(52) U.S. Cl.
CPC .......... *B60L 53/36* (2019.02); *B60L 53/305* (2019.02); *G05D 1/0225* (2013.01); *G05D 1/0238* (2013.01); *B60L 2240/62* (2013.01)

(58) Field of Classification Search
CPC .............................. B60L 53/36; G05D 1/0225
USPC ......................................................... 320/109
See application file for complete search history.

(56) References Cited

U.S. PATENT DOCUMENTS

| | | | |
|---|---|---|---|
| 2015/0073642 A1* | 3/2015 | Widmer ............. | G01C 21/3635 701/22 |
| 2016/0025821 A1* | 1/2016 | Widmer ............... | B60L 53/122 324/258 |
| 2018/0111494 A1* | 4/2018 | Penilla ................. | B60L 53/12 |
| 2018/0141450 A1* | 5/2018 | Oh ........................ | B60L 53/35 |

* cited by examiner

*Primary Examiner* — Suchin Parihar
(74) *Attorney, Agent, or Firm* — Akona IP

(57) ABSTRACT

An EV can be autonomously charged by using its localization and navigation capabilities. The EV determines its pose in a local area and establishes a connection with a charger coordination system. The EV requests the charger coordination system to find a charging station in the local area based on the EV's pose. The charger coordination system uses the EV's pose to find the charging station. The charger coordination system sends the location of the charging station to the EV. The EV navigates to the charger. The EV further determines its pose relative to the charging station and aligns its charge port with the charger plug of the charging station. The EV may plug itself in or request the charger coordination system to insert the charger plug into the charge port. The alignment and insertion process may be managed by using force sensors on the charger plug or charge port.

20 Claims, 8 Drawing Sheets

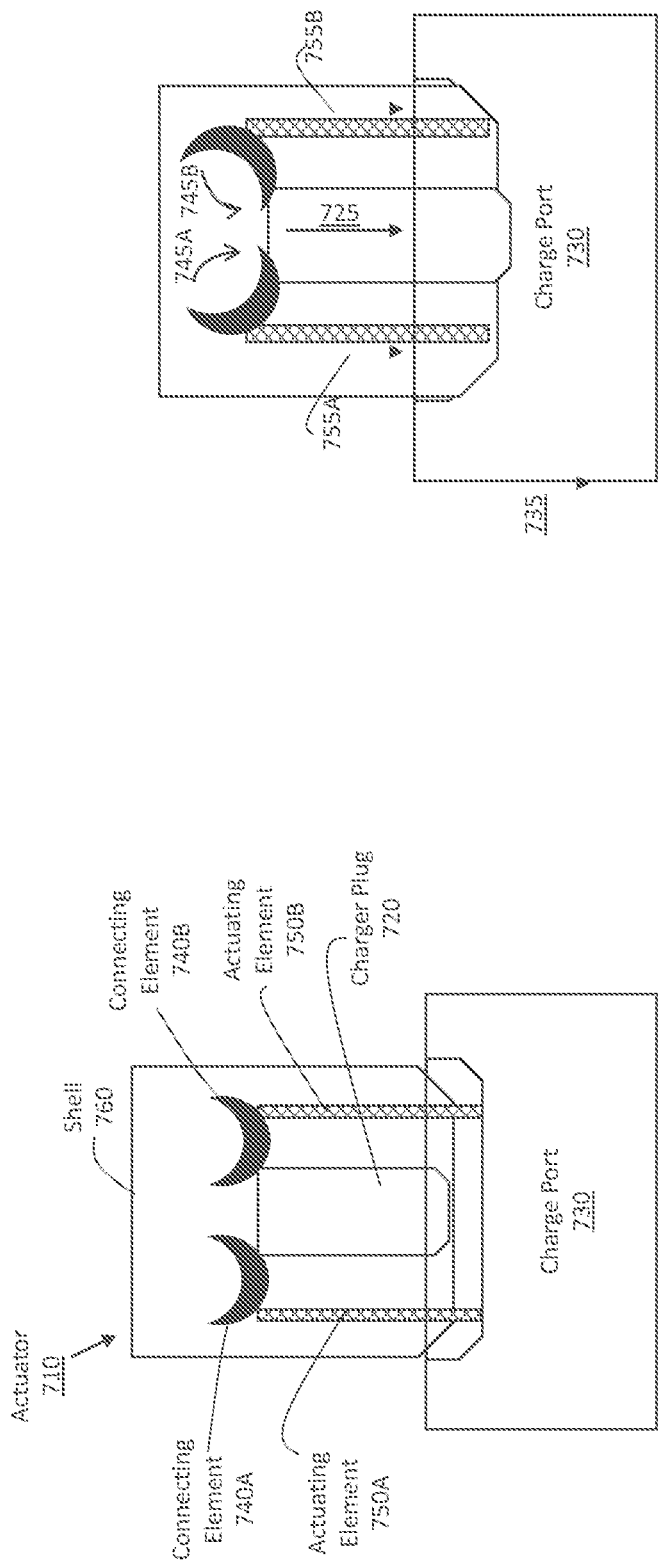

SYSTEM AND METHOD FOR AUTONOMOUSLY CHARGING ELECTRIC VEHICLES

CROSS REFERENCE TO RELATED APPLICATION

This application is a continuation of U.S. application Ser. No. 17/494,398, filed Oct. 5, 2021, which is incorporated by reference its entirety.

TECHNICAL FIELD OF THE DISCLOSURE

The present disclosure relates generally to battery-powered electric vehicles (EVs) and, more specifically, to systems and methods for autonomously charging battery-powered EVs.

BACKGROUND

EVs are powered by batteries that need to be periodically charged. Many EVs include at least one battery for storing power used to run the EVs. After extended use of an EV, the state of charge of the battery may become low and need to be recharged. Accordingly, it is desirable to provide systems and methods that assist in charging EVs. As used herein, the phrase "electric vehicle" or "EV" includes both fully electric and hybrid electric vehicles.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 7A-B illustrate an actuator that drives linear movement of a charger plug for inserting the charger plug into a charge port according to some embodiments of the present disclosure;

DESCRIPTION OF EXAMPLE EMBODIMENTS OF THE DISCLOSURE

Overview

Figure 1:
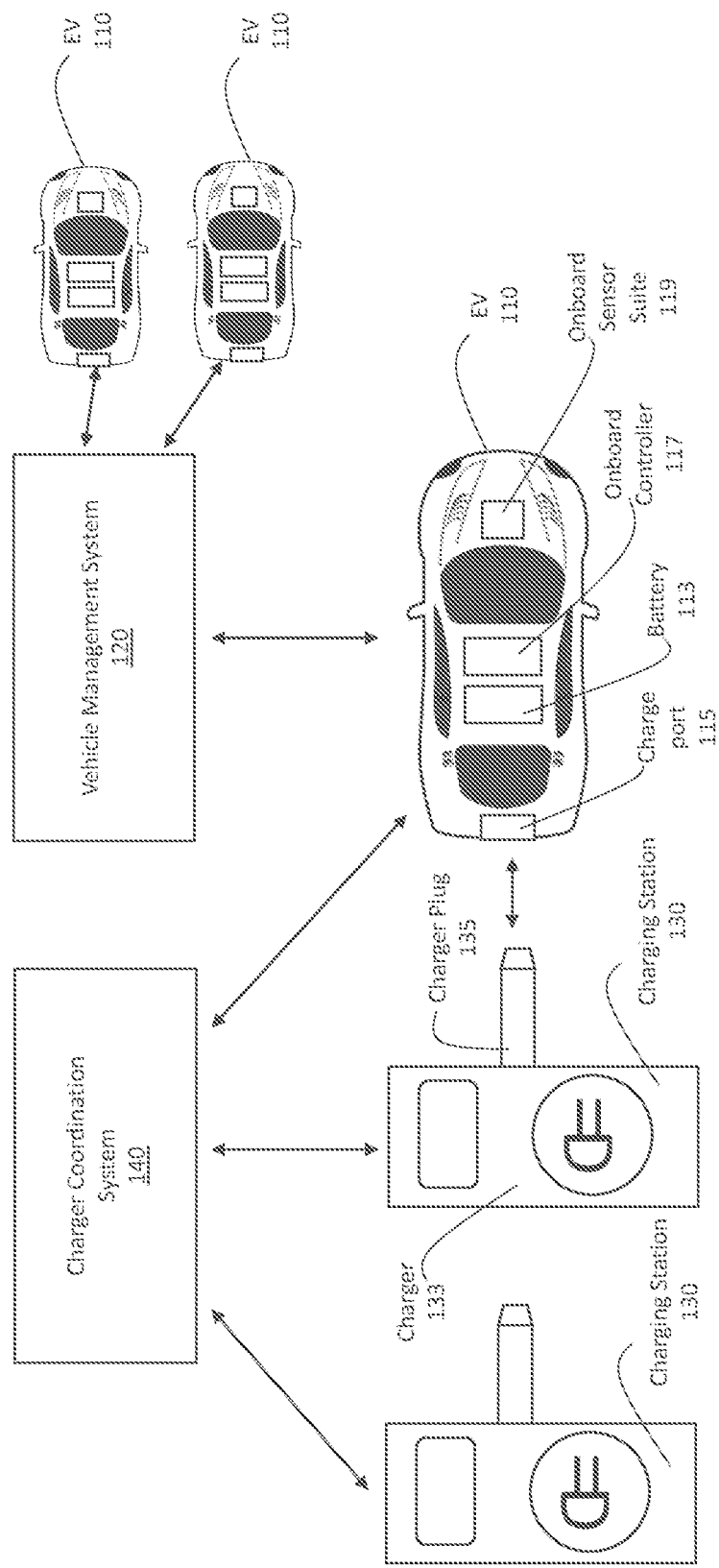
FIG. 1 shows an autonomous charging environment according to some embodiments of the present disclosure.

Charging EVs represents a major cost driver in the operation of EVs, such as the operation of an electric robotaxi fleet. For example, the cost of routing labor to perform charging tasks can be significant. Automatic robotic charging is an opportunity to eliminate or decrease labor costs. However, it typically requires the procurement and installation of external robots in addition to pre-existing EV Supply Equipment (EVSE) chargers. Using such external robots can be technically challenging. For example, the external robots may not be compatible with the EVs or the chargers. Also, the cost for procuring and installing the external robots can be very high. Another conventional approach for automatically charging EV is wireless charging. However, wireless charging requires non-recurring engineering costs to integrate a vehicle receiver pad, which increases the cost for building each individual EV. Also, the vehicle receiver pad introduces additional weight and reduces energy efficiency in operating EVs. The external robotic charging approach and wireless charging approach are both impaired given those challenges. Therefore, improved technology for charging EVs is needed.

An EV charging method based on autonomous localization and navigation overcomes these problems by eliminating the use of external robots and wireless receiver pad. An EV can use autonomous localization and navigation to align its charge port with a charger plug on a charging station. The autonomous localization may include localization with respect to a local area (e.g., a parking garage) where charging stations are located and localization with respect to a particular charging station in the local area. The EV can also communicate with a charger coordination system that manages the charging stations in the local area to find a charging station meeting the need of the EV. The localization, navigation, and communication can be done by using the EV's onboard sensors and onboard controller (e.g., onboard computer) and do not require installation of new components on the EV.

Further, the charger coordination system may control movement of the charger plug to facilitate aligning the charger plug with the charge port or inserting the charger plug into the charge port. In some embodiments, the EV charging system monitors and controls the insertion process by using data generated by force sensors on the charger plug or charge port. The EV or the charger coordination system may adjust the movement of the charge port or the charger plug based on the force sensor data to ensure the charge port and charger plug are aligned during the insertion process. An external positioning robot is not needed for charging the EV. Therefore, the EV charging method of the present disclosure can eliminate the technical challenges, labor requirement, and costs of conventional EV charging technologies.

Embodiments of the present disclosure provide a method for autonomously charging a vehicle, a non-transitory computer-readable storage medium storing instructions executable to perform operations for autonomously charging a vehicle, and a computer-implemented system comprising a processor and a non-transitory computer-readable storage medium storing instructions, when executed by the processor, cause the processor to perform operations for autonomously charging a vehicle. The method includes generating first pose information of the vehicle, the first pose information comprising information describing a pose of the vehicle with respect to a local area; establishing communications with a charger coordination system associated with the local area based on the first pose information; receiving, from the charger coordination system, location information of a charger in the local area; determining a navigation route for navigating the vehicle to the charger based on the first pose information and the location information of the charger; subsequent to arrival of the vehicle at the charger, generating second pose information of the vehicle, the second pose information describing a pose of the vehicle with respect to a charger plug on the charger; and actuating at least one of the vehicle and the charger plug to insert the charger plug into the vehicle based on the second pose information.

Further embodiments of the present disclosure provide a method for autonomously charging a vehicle, a non-transitory computer-readable storage medium storing instructions executable to perform operations for autonomously charging a vehicle, and a computer-implemented system comprising a processor and a non-transitory computer-readable storage medium storing instructions, when executed by the processor, cause the processor to perform operations for autonomously charging a vehicle. The method includes establishing communications with the vehicle; receiving a charging request from the vehicle, the charging request comprising a first pose information of the vehicle, the first pose information of the vehicle comprising information describing a pose of the vehicle with respect to a local area; identifying a charger in the local area based on the first pose information of the vehicle; sending location information of the charger to the vehicle; after sending the location information, receiving second pose information of the vehicle, the second pose information describing a pose of the vehicle with respect to a charger plug on the charger; and instructing the charger to charge the vehicle in accordance with the second pose information of the vehicle.

As will be appreciated by one skilled in the art, aspects of the present disclosure, in particular aspects of dispatch-based charging for electric vehicle fleets, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings.

Other features and advantages of the disclosure will be apparent from the following description and the claims.

As described herein, one aspect of the present technology may be the gathering and use of data available from various sources to improve quality and experience. The present disclosure contemplates that in some instances, this gathered data may include personal information. The present disclosure contemplates that the entities involved with such personal information respect and value privacy policies and practices.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

Example Autonomous Charging System

FIG. 1 shows an autonomous charging environment 100 according to some embodiments of the present disclosure. The autonomous charging environment 100 includes EVs 110, a vehicle management system 120, charging stations 130, and a charger coordination system 140. In other embodiments, the autonomous charging environment 100 may include fewer, more, or different components. For instance, the autonomous charging environment 100 may include a different number of EVs or a different number of charging stations. A single EV is referred to herein as EV 110, and multiple EVs are referred to collectively as EVs 110. A single charging station is referred to herein as charging station 130, and multiple charging stations are referred to collectively as charging stations 130. In some embodiments, the autonomous charging environment 100 includes one or more communication networks (not show in FIG. 1) that supports communications between some or all of the components in the autonomous charging environment 100.

An EV 110 is a vehicle that is at least partially powered by electricity. In some embodiments, an EV 110 is a fully autonomous electric automobile. In other embodiments, each EV 110 may additionally or alternatively be another semi-autonomous or fully autonomous vehicle, e.g., a boat, an unmanned aerial vehicle, a driverless car, etc. Additionally, or alternatively, the EV 110 may be a vehicle that switches between a semi-autonomous state and a fully autonomous state and thus, the EV may have attributes of both a semi-autonomous vehicle and a fully autonomous vehicle depending on the state of the vehicle. In some embodiments, some or all of the EVs 110 are non-autonomous electric vehicles. In embodiments where the EVs 110 are autonomous, each EV 110 may include a throttle interface that controls an engine throttle, motor speed (e.g., rotational speed of electric motor), or any other movement-enabling mechanism; a brake interface that controls brakes of the EV (or any other movement-retarding mechanism); and a steering interface that controls steering of the EV (e.g., by changing the angle of wheels of the EV). The EV 110 may additionally or alternatively include interfaces for control of any other vehicle functions, e.g., windshield wipers, headlights, turn indicators, air conditioning, etc.

As shown in FIG. 1, an EV 110 includes a battery 113, a charge port 115, an onboard controller 117, and an onboard sensor suite 119. In other embodiments, the EV 110 may include fewer, more, or different components.

The battery 113 is a rechargeable battery that powers the EV 110. The battery 113 may be a lithium-ion battery, a lithium polymer battery, a lead-acid battery, a nickel-metal hydride battery, a sodium nickel chloride ("zebra") battery, a lithium-titanate battery, or another type of rechargeable battery. In some embodiments, the EV 110 is a hybrid electric vehicle that also includes an internal combustion engine for powering the EV 110, e.g., when the battery 113 has low charge. In some embodiments, the EV 110 includes multiple batteries 113, e.g., a first battery used to power vehicle propulsion, and a second battery used to power EV hardware (e.g., the onboard controller 117 and the onboard sensor suite 119).

The charge port 115 provides an interface for charging the battery 113. The charge port 115 is electrically connected to the battery 113. The charge port 115 in FIG. 1 is located at the rear of the EV 110. However, in other embodiments, the charge port 115 may be located at the front or a side of the EV 110. The EV 110 may include multiple charge ports 115 for the battery 113 or may have one charge port 115 for multiple batteries 113. The charge port 115 is configured to receive a charger plug 135 of a charging station 130. The EV 110 is plugged into the charging station 130 through the charge port 115 and the charger plug 135. For instance, the charger plug 135 can be inserted into the charge port 115 to plug in the EV 110. More details regarding the charge port 115 are described below in conjunction with FIG. 5 and FIG. 6.

In some embodiments, the EV also includes a charge port door (not shown in FIG. 1) associated with the charge port 115. The charge port door is open when the EV is being charged or is ready for charging. When the EV is not being charged or is not ready for charging, the charge port door can be closed to protect the charge port from contamination and undesired contact with objects or people. The charge port door can be opened and closed autonomously. More details about the charge port door are described below in conjunction with FIGS. 10 and 11.

The onboard sensor suite 119 detects the surrounding environment of the EV 110 and generates sensor data describing the surrounding environment. The onboard sensor suite 119 may include various types of sensors. In some embodiments, the onboard sensor suite 119 includes a computer vision ("CV") system, localization sensors, and driving sensors. For example, the onboard sensor suite 119 may include photodetectors, cameras, RADAR, Sound Navigation And Ranging (SONAR), Light Detection and Ranging (LIDAR), Global Positioning System (GPS), wheel encoders, inertial measurement units (IMUS), accelerometers, microphones, ultrasonic sensors, strain gauges, pressure monitors, barometers, thermometers, altimeters, ambient light sensors, etc. The sensors may be located in various positions in and around the EV 110. In some embodiments, the onboard sensor suite 119 may include force sensors (not shown in FIG. 1) on the charge port 115. The force sensors may be located at different portions of the charge port 115 to detect forces applied on those portions of the charge port 115. More details regarding the force sensors are described below in conjunction with FIGS. 8A-B and 9A-B.

The onboard controller 117 controls operations and functionality of the EV 110. In some embodiments, the onboard controller 117 is a general-purpose computer, but may additionally or alternatively be any suitable computing device. The onboard controller is adapted for I/O communication with other components of the EV 110 (e.g., the battery 113, the charge port 115, or the onboard sensor suite 119) and external systems (e.g., the vehicle management system 120 and the charger coordination system 140). The onboard controller 117 may be connected to the Internet via a wireless connection (e.g., via a cellular data connection). Additionally or alternatively, the onboard controller 117 may be coupled to any number of wireless or wired communication systems.

The onboard controller 117 controls charging and operation of the battery 113. For instance, the onboard controller 117 supports autonomous charging of the EV 110 by localizing and navigating the EV 110 in a local area where charging stations 130 are located (e.g., a charging site, parking garage, parking lot, etc.). The onboard controller 117 localizes and navigates the EV 110 to align the charge port 115 of the EV 110 with the charger plug 135 of a charging station 130. The onboard controller 117 may also navigate the EV 110 to plug the EV 110 into the charging station 130. The onboard controller 117 may control the localization and navigation of the EV 110 based on sensor data generated by the onboard sensor suite 119 or external sensors (e.g., sensors on the charger plug 135, sensors in the surrounding environment of the EV 110, etc.).

In some embodiments, the onboard controller 117 localizes the EV 110 with respect to the local area and generates pose information that describe a pose of the EV 110 with respect to the local area. The pose information may include, for example, a position of the EV 110 in the local area or an orientation of the EV 110 in the local area. In an embodiment, the pose information describes an orientation of the EV 110 with respect to an orientation of a model (e.g., a map) of the local area. The onboard controller 117 may align the EV 110 with the model of the local area based on the pose information. In some embodiments, the onboard controller 117 localizes the EV 110 with respect to a charging station 130, e.g., a charger plug 135 of the charging station. The onboard controller 117 generates pose information describe a pose of the EV 110 with respect to the local area, e.g., a position of the charge port 115 of the EV 110 relative to the charger plug 135, an orientation of the charge port 115 of the EV 110 relative to the charger plug 135, etc. The onboard controller 117 may further determine whether the charge port 115 and the charger plug 135 are aligned, e.g., whether a linear movement of the charge port 115 relative to the charger plug 135 can plug the EV 110 into the charging station 130. After the onboard controller 117 determines that the charge port 115 and charger plug 135 are aligned, the onboard controller 117 may also navigate the EV 110 towards the charger plug 135 to insert the charger plug 135 into the charge port 115. The onboard controller 117 may monitor and control the alignment and insertion process based on sensor data generated by force sensors on the charge port 115.

In various embodiments, the onboard controller 117 communicates with the charger coordination system 140 associated with the local area and requests the charger coordination system 140 to allocate a charging station 130 to the EV 110, to facilitate the alignment and insertion process, or to start/stop charging. The onboard controller 117 may send a charging request to the charger coordination system 140 and instruct the charger coordination system to identify a charging station based on the charging request. The charging request includes the pose information of the EV 110 with respect to the local area. The charging request may also include charging parameters, such as charging rate (e.g., a rate indicating how fast the battery 113 is charged), charger type (e.g., direct current (DC) or alternating current (AC) charger), charge level (e.g., a target charge level, a current charge level, or an amount of power needed by the battery 113), charging time, other charging parameters, or some combination thereof. The onboard controller 117 may also communicate with the charger coordination system to align the charge port 115 with the charger plug 135 or insert the charger plug 135 into the charge port 115. For instance, the onboard controller 117 may request the charger coordination system 140 to move the charger plug 135 based on the pose information of the EV 110.

In various embodiments, the onboard controller 117 interfaces with battery sensors for determining a current charge level of the battery 113. The onboard controller 117 may coordinate providing power to various subsystems; for example, during charging, the onboard controller 117 provides power to one subset of subsystems (e.g., a communication subsystem and an autonomous driving sensor subsystem) and does not provide power to a different set of subsystems (e.g., a propulsion subsystem). In embodiments where the EV 110 includes multiple batteries, the onboard controller 117 may manage charging of the multiple batteries, e.g., by dividing received power between the batteries. The onboard controller 117 may include an onboard charger that converts AC to DC. The onboard charger is used when the EV 110 is charged by a charging station 130 that delivers AC; if the charging station 130 delivers DC, the onboard charger is bypassed.

The onboard controller 117 processes sensor data generated by the onboard sensor suite 119 and/or other data (e.g., data received from the vehicle management system 120) to determine the state of the EV 110. Based upon the vehicle state and programmed instructions, the onboard controller 117 modifies or controls behavior of the EV 110. In some embodiments, the onboard controller 117 implements an autonomous driving system (ADS) for controlling the EV 110 and processing sensor data from the onboard sensor suite 119 and/or other sensors in order to determine the state of the EV 110. Based upon the vehicle state and programmed instructions, the onboard controller 117 modifies or controls driving behavior of the EV 110.

The vehicle management system 120 manages the EVs 110. The vehicle management system 120 may manage a service that provides or uses the EVs 110, e.g., a service for providing rides to users with the EVs 110, or a service that delivers items using the EVs (e.g., prepared foods, groceries, packages, etc.). The vehicle management system 120 may select an EV from a fleet of EVs 110 to perform a particular service or other task, and instruct the selected EV (e.g., EV 110a) to autonomously drive to a particular location (e.g., a delivery address). The vehicle management system 120 also manages maintenance tasks, such as charging and servicing of the EVs 110.

As shown in FIG. 1, the EVs 110 communicate with the vehicle management system 120. The EVs 110 and vehicle management system 120 may connect over a network. The network may comprise any combination of local area and/or wide area networks, using both wired and/or wireless communication systems. In one embodiment, the network uses standard communications technologies and/or protocols. For example, the network includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as JavaScript Object Notation (JSON) or extensible markup language (XML). In some embodiments, all or some of the communication links of the network may be encrypted using any suitable technique or techniques.

In some embodiments, the vehicle management system 120 may also provide an EV 110 (and particularly, the onboard controller 117) with system backend functions. The vehicle management system 120 may include one or more switches, servers, databases, live advisors, or an automated voice response system (VRS). The vehicle management system 120 may include any or all of the aforementioned components, which may be coupled to one another via a wired or wireless local area network (LAN). The vehicle management system 120 may receive and transmit data via one or more appropriate devices and network from and to the EV 110, such as by wireless systems, such as 882.11x, GPRS, and the like. A database at the vehicle management system 120 can store account information such as subscriber authentication information, vehicle identifiers, profile records, behavioral patterns, and other pertinent subscriber information. The vehicle management system 120 may also include a database of areas, roads, routes, locations, etc. permitted for use by EV 110. For instance, the vehicle management system 120 includes a database of two- or three-dimensional models of various areas. A model of an area may be a map of the area. The vehicle management system 120 may communicate with the EV 110 to provide route guidance in response to a request received from the vehicle.

For example, based upon information stored in a mapping system of the vehicle management system 120, the vehicle management system 120 may determine the conditions of various roads or portions thereof. Autonomous vehicles, such as the EV 110, may, in the course of determining a navigation route, receive instructions from the vehicle management system 120 regarding which roads or portions thereof, if any, are appropriate for use under certain circumstances, as described herein. Such instructions may be based in part on information received from the EV 110 or other autonomous vehicles regarding road conditions. Accordingly, vehicle management system 120 may receive information regarding the roads/routes generally in real-time from one or more vehicles.

A charging station 130 is configured to charge the battery 113 of the EV 110. The charging station 130 shown in FIG. 1 has a charger 133 and charger plug 135. The charger 133 provides electricity supply. The charger 133 may be an AC charger or DC charger. The charger plug 135 connects the charger 133 to the EV 110. The charger plug 135 can be inserted into the charge port 115 of the EV 110 to plug in the EV 110. In various embodiments, the charging station 130 further includes a passive alignment mechanism that is coupled to the charger plug 135 or is a part of the charger plug 135. The passive alignment mechanism enables the charger plug 135 to adjust its pose without an actuator or other controllable motion mechanisms. The passive alignment mechanism may move the charge plug 135 along a horizontal direction (e.g., side-to-side) or a vertical direction (e.g., upward and downward). In some embodiments, the passive alignment mechanism moves the charger plug 135 when a force is unevenly applied to different portions of a cross-section of the charger plug 135. For instance, the passive alignment mechanism moves the charger plug 135 in response to a lateral force applied on the charger plug 135 due to misalignment between the charger plug 135 and the charge port 115. The force may be applied by the EV 110 when the EV 110 navigates towards the charger plug 135 to plug into the charging station 130. With the passive alignment mechanism, the charger plug 135 can self-align with the charge port 115 during the insertion process without an actuator or other controllable motion mechanisms. The passive alignment mechanical can also ensure the force is evenly distributed across the cross-section of the charge plug 135. The passive alignment mechanism can be monitored by using force sensor on the charge plug 135. In some embodiments, the passive alignment mechanism includes balls, rods, slides, springs, other types of mechanical alignment elements, or some combination thereof.

The charging station 130 may have a maximum charging rate, and the charging station 130 is able to charge a connected EV 110 at the maximum charging rate or at a lower rate. The charging station 130 may communicate with the charger coordination system 140 through a wired connection or a wireless connection.

The charger coordination system 140 manages the charging stations 130. In various embodiments, the charger coordination system 140 is associated with a local area and manages the charging stations 130 in the local area. The charger coordination system 140 can establish communications with an EV 110 entering the local area and facilitate autonomous charging of the EV 110. For instance, the charger coordination system 140 receives a charging request from the EV 110 and identifies a charging station 130 for the EV 110 based on the charging request. The charger coordination system 140 may also support alignment of the charge port 115 of the EV 110 with the charger plug 135 of the charging station 130. In some embodiments, the charger coordination system 140 controls an actuator associated with the charger plug 135. The charger coordination system 140 controls the pose of the charger plug 135 by using the actuator to align the charge plug 135 with the charge port 115. The charger coordination system 140 may move the charger plug 135 along two perpendicular axes.

In some embodiments, the charger coordination system 140 inserts the charger plug 135 into the charge port 115, e.g., through a linear movement of the charger plug. The charger coordination system 140 may monitor alignment between the charger plug 135 and the charge port 115 during the insertion process by using force sensors on the charger plug 135. For instance, the charger coordination system 140 determines whether the insertion force is evenly distributed on a cross-section of the charger plug 135 based on sensor data generated by force sensors located at different positions on the cross-section of the charger plug 135. Subsequent to determining an uneven force distribution, the charger coordination system 140 adjusts the pose of the charger plug 135 to align the charger plug 135 with the charge port 115. Additionally or alternatively, the charger coordination system 140 communicates the uneven force distribution to the onboard controller 117 for the onboard controller 117 to change a pose of the charge port 115 accordingly. In embodiments where the charging station 130 includes the passive alignment mechanism, the charger coordination system 140 can monitor the passive alignment mechanism by using the force sensors. The charging coordination system 140 may also detect whether the EV 110 is fully plugged in, e.g., based on a state of the charger plug 135 and ready for charging. The charging coordination system 140 may also instruct the charging station 130 to start or stop charging the EV 110 based on requests from the EV 110.

In some embodiments, the charger coordination system 140 may operate a network of the charging stations 130. The network of charging stations 130 may include a single type of charging stations 130 (e.g., DC fast-charging stations), or a mix of charging stations 130 (e.g., some AC level 2 charging stations, and some DC charging stations). Charging stations 130 in the network may be distributed across one or more geographic regions in which the EVs 110 operate. Charging stations 130 may be included in EV facilities operated by the vehicle management system 120, e.g., facilities for storing, charging, or maintaining EVs. In some embodiments, the EVs 110 may use charging stations outside of the network operated by the vehicle management system 120, e.g., charging stations available to the public, charging stations in private homes, charging stations on corporate campuses, etc.

Example Onboard Controller

Figure 2:
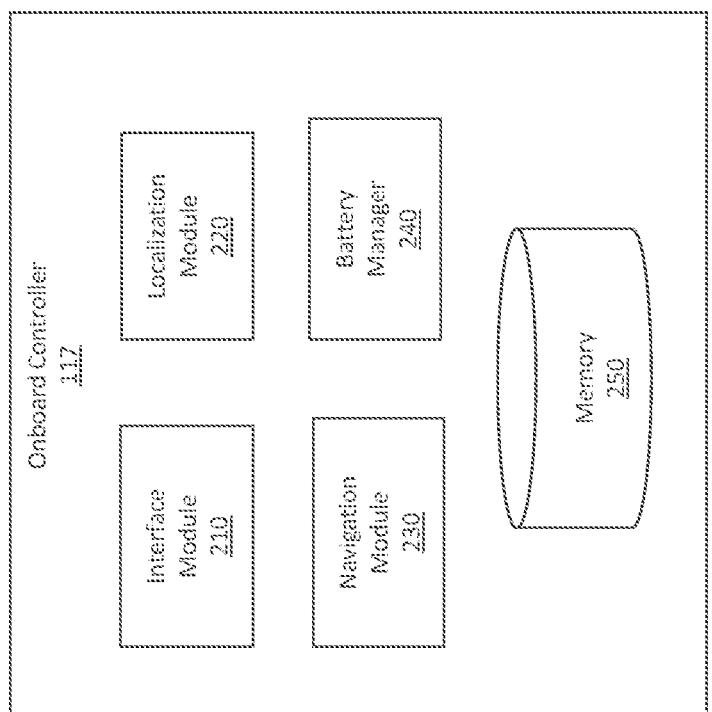
FIG. 2 is a block diagram illustrating the onboard controller according to some embodiments of the present disclosure.

FIG. 2 is a block diagram illustrating the onboard controller 117 according to some embodiments of the present disclosure. The onboard controller 117 includes an interface module 210, a localization module 220, a navigation module 230, a battery manager 240, and a memory 250. Alternative configurations, different or additional components may be included in the vehicle management system 120. Further, functionality attributed to one component of the vehicle management system 120 may be accomplished by a different component included in the vehicle management system 120 or a different system than those illustrated.

The interface module 210 facilitates communications of the onboard controller 117 with other systems. For instance, the interface module 210 supports communications of the onboard controller 117 with the vehicle management system 120, the charger coordination system 140, other EVs 110, other systems, databases, and so on. For instance, the interface module 210 establishes communications between the onboard controller 117 and the charger coordination system 140 after the EV 110 enters the local area associated with the charger coordination system 140.

The localization module 220 localizes the EV 110. The localization module 220 may use sensor data generated by the onboard sensor suite 119 to determine where the EV 110 is. The sensor data includes information describing an absolute position or orientation (e.g., data generated by GPS, GNSS), information describing features surrounding the EV 110 (e.g., data generated by a camera, RADAR, SONAR, LINAR, etc.), information describing motion of the EV 110 (e.g., data generated by IMUs, wheel encoders, etc.), or some combination thereof. In some embodiments, the localization module 220 uses the sensor data to determine whether the EV 110 has entered a local area, such as a parking garage or parking lot where the EV 110 can be charged. In some other embodiments, the localization module 220 may send localization estimates or sensor data to the vehicle management system 120 and receives from the vehicle management system 120 a determination whether the EV 110 has entered the local area.

The localization module 220 can further localize the EV 110 within the local area. For instance, the localization module 220 determines a pose (position or orientation) of the EV 110 in the local area. In some embodiments, the localization module 220 localizes the EV 110 within the local area by using a model of the local area. The model may be a 2D or 3D representation of the surrounding area, such as a map or a 3D virtual scene simulating the local area. In various embodiments, the localization module 220 receives the model of the local area from the vehicle management system 120 or retrieves the model from the memory 250. The localization module 220 may send a request for the model to the vehicle management system 120 and in response, receive the model of the local area. In some embodiments, the localization module 220 generates the request based on sensor data indicating a position or motion of the EV 110. For instance, the localization module 220 detects that the EV 110 is in the local area or is navigated to enter the local area based on the sensor data and sends out the request in response to such detection. This process can be dynamic. For example, the localization module 220 may send new requests to the vehicle management system 120 as the EV 110 changes its position. The localization module 220 accesses the model of the local area and determines a pose of the EV 110 in the model.

The localization module 220 may further localize the EV 110 with respect to an object in the local area. An example of the object is a charging station in the local area. The localization module 220 may determine a pose of the EV 110 relative to the charging station based on features associated with the object in the local area. For example, the localization module 220 retrieves sensor data from one or more sensors (e.g., camera, LIDAR, etc.) in the onboard sensor suite 119 that detect the features. The localization module 220 uses the sensor data to determine the pose of the EV 110. Features associated with the charging station include features on the charging station and features surrounding the charging station. A feature may be two-dimensional or three-dimensional. Example features associated with a charging station include a wall, a lane marker, a lane line, a fiducial marker, a sign, a post, a rail, a landmark, or some combination thereof.

The localization module 220 may store localization information of the EV 110 in the memory 250 or send the localization information to other modules of the onboard controller 117 for purposes like navigating or charging the EV 110.

The navigation module 230 controls motion of the EV 110. In various embodiments, the navigation module 230 generates a navigation route for the EV 220 based on a location of the EV 110, a destination, and a model of a local area (e.g., a map). The navigation module 230 may receive the location of the EV 110 from the localization module 220. The navigation module 230 may determine the destination, e.g., based on the model of the local area. For instance, the navigation module 230 receives a request to go to a point of interest (e.g., store, restaurant, bank, parking garage, etc.) and in response to the request, identifies the point of interest on the map and uses the point of interest as the destination. Alternatively, the navigation module 230 may receive the destination from an external source, such as the vehicle management system 120 or the charger coordination system 140. For example, the navigation module 230 receives a location of a charging station 130 from the charger coordination system 140 and uses the location of the charging station 130 as a destination for the EV 220. The navigation module 230 may generate a route to navigate the EV 220 from its current location to the charging station 130.

The navigation module 230 may also control the motor and wheels of the EV 110 to move the EV 110 to a desired pose (position or orientation). For example, the navigation module 230 moves the EV 110 closer to the charging stations 130 in the local area. As another example, the navigation module 230 moves the EV 110 to establish communications between the EV 100 and the charger coordination system 140. In another embodiment, the navigation module 230 moves the EV 110 to align the charge port of the EV 110 with the charger plug 135 of the charging station 130 allocated to the EV 110. The navigation module 230 may also move the EV 110 to plug the EV 110 into the charging station 130.

The battery manager 240 manages the battery 113 in the EV 110. For instance, the battery manager 240 monitors the charging status of the battery 113. The battery manager 240 determines whether there is a need to charge the battery 113. In some embodiments, the battery manager 240 checks the charge level of the battery and determines that the battery 113 needs to be charged based on an indication that the charge level is below a threshold charge level. In some embodiments, the threshold charge level is a fixed charge level, such as a charge level that is sufficient for the EV 110 to operate for a predetermined amount of time or navigate for a predetermined amount of distance. In other embodiments, the threshold charge level may change. For instance, the battery manager 240 determines the threshold charge level based on a determination of power needed by the EV to complete its current route, availability of charging stations on the route, or other factors.

The battery manager 240 generates charging requests to request for a charging station 130 after it determines that there is a need to charge the battery. The battery manager 240 may send charging requests to the navigation module 230 and the charger coordination system 140. For instance, the battery manager 240 sends a charging request to the navigation module 230 and requests the navigation module 230 to find a local area where a charging station is available. After the EV 110 arrives at the local area, the battery manager 240 may send a communicating request to the charger coordination system 140 to establish communications with the charger coordination system. The battery manager 240 may also send a charging request to the charger coordination system 140 and request the charger coordination system 140 to allocate a charging station 130 to the EV 110. In some embodiments, the charging request includes location information of the EV 110 generated by the localization module 220, such as information describing a pose of the EV 110 in the local area. The charging request may also include charging parameters, such as amount of power needed by the EV 110, current charge level of the battery 113, target charge level, charging time, charging rate, charger type, other types of charging parameters, or some combination thereof.

The battery manager 240 receives the location of the charging station 130 that is allocated to the EV 110 by the charger coordination system 140. The battery manager 240 may send the location of the charging station 130 to the navigation module 230 for navigating the EV 110 to the charging station 130. After the EV 110 arrives at the charging station 130, the battery manager 240 aligns the charge port 115 of the EV 110 with the charger plug 135 of the charging station 130. For instance, the battery manager 240 receives the localization information of the EV 110 from the localization module 220 and uses the localization information to determine whether the charge port 115 is aligned with the charger plug 135 for charging purpose, meaning whether a linear movement of the charge port 115 in relative to the charger plug 135 can be sufficient for inserting the charger plug 135 into the charge port 115 to charge the battery 113.

In embodiments where the battery manager 240 determines that the charge port 115 and the charger plug 135 are not aligned, the battery manager 240 may request the charger coordination system 140 to move the charger plug 135 to align the charger plug 135 with the charge port 115. For instance, the battery manager 240 determines a target pose of the charger plug 135, at which the charger plug 135 will align with the charge port 115, based on the localization information of the EV 110. The battery manager 240 then requests the charger coordination system 140 to move the charger plug 135 to the target pose. Additionally or alternatively, the battery manager 240 may request the navigation module 230 to change the pose of the EV 110 to facilitate the alignment. For instance, the battery manager 240 determines a target pose of the EV 110, with which the charge port 115 will be aligned with the charger plug 135. The battery manager 240 requests the navigation module 230 to move the EV 110 to the target pose. In an embodiment, the battery manager 240 determines whether a passive alignment mechanism of the charger plug 135 can align the charger plug 135 with the charge port 115. For instance, the battery manager 240 determines a distance that the charger plug 135 needs to travel to align with the charge port 115, e.g., based on the pose of the EV 110. The battery manager 240 also determines whether the distance is less than the maximum distance that the charger plug 135 can travel by using the passive alignment mechanism. After determining that the passive alignment mechanism of the charger plug 135 can align the charger plug 135 with the charge port 115, the battery manager 240 navigates the EV 110 towards the charge plug 135 to apply a force on the charger plug 135 and trigger the passive alignment mechanism to align the charger plug 135 with the charge port 115.

In embodiments where the battery manager 240 determines that the charge port 115 and the charger plug 135 are aligned, the battery manager 240 may request the navigation module 230 to move the EV 110 towards the charger plug 135 or request the charger coordination system 140 to move the charger plug 135 towards the charge port 115 to plug in the EV 110. The battery manager 240 may monitor the insertion process by using force sensors on the charge port 115 or the charger plug 135. The battery manager 240 analyzes force distribution on an interface between the charge port 115 and the charger plug 135 based on data generated by the force sensors. The battery manager 240 detects whether force is evenly applied at different portions of the interface. After the battery manager 240 detects unevenly applied force, the battery manager 240 changes the movement direction of the EV 110 or the charger plug 135 through the navigation module 230 or the charger coordination system 140, respectively. More details regarding the force sensors are described below in conjunction with FIGS. 8A-B and 9A-B.

As the charger plug 135 is fully inserted into the charge port 115, the charging may start. In some embodiments, the battery manager 240 detects a connection between the charger plug 135 and the charge port 115, e.g., by using a sensor on the charge port 115. In response to detecting the connection, the battery manager 240 sends a start-charging request to the charger coordination system 140. The charge coordination system 140 may trigger the charging station 130 to charge the battery 113 based on the start-charging request.

The battery manager 240 may also send the charger coordination system 140 a stop-charging request after it determines that a target charge level of the battery 113 is reached. The charger coordination system 140 will stop the charging station from charging the battery 113 based on the request. The battery manager 240 can also request the charger coordination system 140 to retract the charger plug 135 from the charge port 115 or request the navigation module 230 to move the EV 110 to detach from the charger plug 135. In some embodiments, the battery manager 240 determines the target charge level for the battery 113 to reach during charging. In an embodiment, the target charge level is a full charge. In another embodiment, the target charge level is a charge level that is sufficient to carry out a predicted usage of the EV 110 after the EV 110 is charged, e.g., a charge that allows the EV 110 to travel a certain number of miles, or a certain period of time. The target charge level may include a buffer, e.g., in case the EV 110 is rerouted or experiences unexpected power draws. The battery manager 240 may calculate the target charge level for carrying out the predicted usage based on data describing historical discharge rates of the battery 113.

The battery manager 240 may incorporate additional data relating to expected power usage when calculating the target charge level. For example, the battery manager 240 retrieves data describing weather conditions in the environment of the EV 110 and, based on the weather conditions, calculates an anticipated power draw on the battery 113 for powering the HVAC (heating, ventilation, and air conditioning) system of the EV 110 during the predicted usage. As another example, the battery manager 240 retrieves data describing a projected route of the EV 110 and determines the expected power draw on the battery 113 based on the projected route. The battery manager 240 may determine the expected power draw based on the length of the route and data describing the roadways that the route traverses. For example, a route that travels over hillier or rougher terrain draws more power than a route that travels over flat terrain; a route that is mainly on city streets draws less power than a route that is mainly on highways. The battery manager 240 may further receive traffic data, or projected traffic data, for the projected route of the EV 110 and determine the expected power draw based on the traffic data. For example, the battery manager 240 may calculate an expected power draw for a route during rush hour that is higher than the route during midday. The traffic data may be received from a traffic data source, or the traffic data may be compiled by the fleet manager 120 based on observed traffic and speeds of EVs in the fleet. The battery manager 240 may train a model for predicting power demands based on the historical battery data and use this model to determine the target charge level for carrying out the predicted usage. The battery manager 240 may also account for a power draw on the battery 113 during charging when calculating the length of time to reach the target charge level. For example, some subsystems, such as the communications subsystem, onboard controller 117, onboard sensor suite 119, or other systems may continue to draw power while the battery 113 is charging.

The battery manager 240 may also control the opening and closing of the charge port door for the charge port 135. For instance, the battery manager 240 instructs an actuator to open the charge port door after it determines that the charge port 115 and the charger plug 135 are aligned. As another example, the battery manager 240 instructs the actuator to close the charge port door after it determines that the charging is done and the charger plug 135 is retracted from the charge port 115.

The memory 250 stores data for the onboard controller 117. For instance, the memory 250 stores data received by and sent by the onboard controller 117, e.g., through the interface module 210. The memory 250 also stores data generated by the localization module 220, navigation module 230, and battery manager 240.

Example Charging Coordination System

Figure 3:
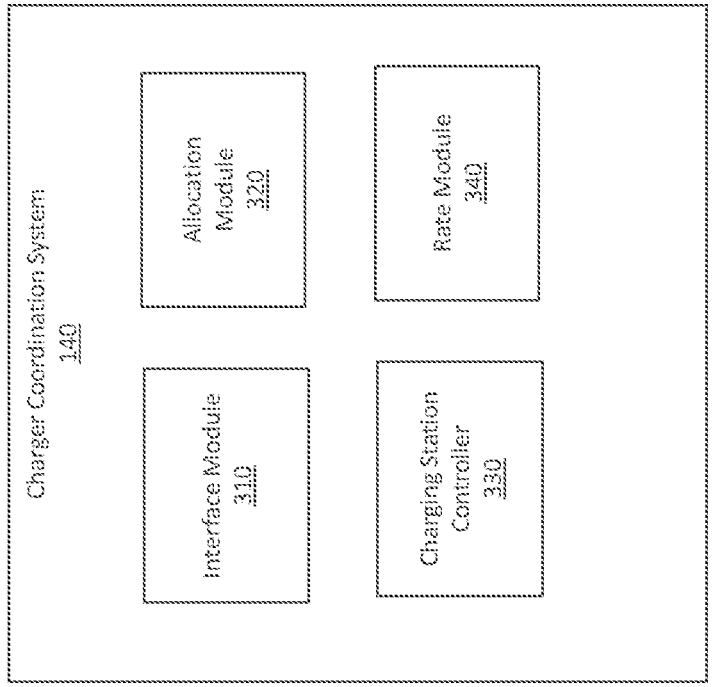
FIG. 3 is a block diagram illustrating the charger coordination system according to some embodiments of the present disclosure.

FIG. 3 is a block diagram illustrating the charger coordination system 140 according to some embodiments of the present disclosure. The charger coordination system 140 includes an interface module 310, an allocation module 320, a charging station controller 330, and a rate module. Alternative configurations, different or additional components may be included in the vehicle management system 120 or charging station 130. Further, functionality attributed to one component of the vehicle management system 120 or the onboard controller 117 may be accomplished by a different component included in charger coordination system 140.

The interface module 310 facilitates communications of the charger coordination system 140 with other systems. For instance, the interface module 210 supports communications of the charger coordination system 140 with charging stations 130, onboard controllers of EVs 110, other systems, databases, and so on. For instance, the interface module 210 establishes communications between the charger coordination system 140 and the onboard controller 117 after the EV 110 enters the local area associated with the charger coordination system 140.

The allocation module 320 allocates charging stations 130 to EVs 110. The allocation module 320 receives charging requests from the EVs 110. A charge request may include information describing a pose of the EV in the local area where the charging stations 130 are located or charging parameters. The allocation module 320 also monitors the charging stations 130 associated with the charger coordination system 140. For instance, the allocation module 320 monitors current availability (i.e., whether there is an EV 110 currently charging at a charging station 130), future availability (e.g., expected remaining charge duration of the currently charging EVs 110), locations, amount of available power, charging rate, charger type (AC or DC), or other information of the charging stations 130.

The allocation module 320 uses the charging request and information of the charging stations 130 to allocate the charging stations 130 to the EV 110. For instance, the allocation module 320 selects a charging station 130 from all the available charging stations based on the pose of the EV 110 and the location of the charging station 130. In one embodiment, the allocation module 320 selects an available charging station 130 that the EV 110 can reach through the shortest navigation route from the current position of the EV 110. In another embodiment, the allocation module 320 selects the charging station based on other factors of the charging station 130. For example, the allocation module 320 selects a charging station 130 whose available power is no less than the amount of power needed by the EV 110. As another example, the allocation module 320 selects a charging station 130 having the type of charger or charging method that fits the EV 110. The allocation module 320 may also determine whether to allocate a charging station 130 to the EV 110 based on the amount of time the charging station will need to charge the EV 110 and the amount of time the EV 110 will be available. After the allocation module 320 identifies the charging station 130 for the EV 110, the allocation module 320 sends the location of the charging station 130 to the EV 110 for the EV 110 to be navigated to the charging station 130.

In some embodiments, the allocation module 320 may identify multiple charging stations 130 for the EV 110 and allow the EV 110 (e.g., the onboard controller 117) to select which charging station 130 to use. In some embodiments, the allocation module 320 may determine that currently there are no charging stations 130 available for the EV 110. The allocation module 320 may maintain a charging queue for one or more charging stations 130. The allocation module 320 may put the EV 110 into the charging queue, determine a waiting time for the EV 110, and provide the waiting time for the EV 110.

The charging station controller 330 controls individual charging stations 130. The charging station controller 330 may detect the arrival of an EV 110 at a charging station 130. The charging station controller 330 manages the charging of the EV 110 by the charging station 130. In various embodiments, the charging station controller 330 receives information describing a pose of the EV 110 in relative to the charging station 130. The charging station controller 130 instructs the charging station 130 to charge the EV 110 based on the pose of the EV 110. In an embodiment, the charging station controller 330 determines whether its charger plug 135 is aligned with the charge port 115 of the EV 110. When the charging station controller 330 determines that the charger plug 135 is not aligned with the charge port 115, the charging station controller 330 instructs an actuator for the charger plug 135 to move the charger plug 135 to a new position or orientation where the charger plug 135 is aligned with the charge port 115.

After the charger plug 135 and the charge port 115 are aligned, the charging station controller 330 may instruct the actuator to linearly move the charger plug 135 to insert the charger plug 135 into the charge port of the EV 110. The charging station controller 330 may control the insertion process by using sensor data generated by force sensors on the charger plug 135. For instance, the charging station controller 330 receives the sensor data from the charging station 130 and analyzes force distribution on the charger plug 135 based on the received data. The charging station controller 330 may determine an actuation orientation based on the force distribution and instructs the actuator to change the pose of the charger plug 135 based on the actuation orientation so that force can be evenly applied on different portions of the charger plug 135.

The charging station controller 330 may detect a connection between the charger plug 135 and the charge port 115. After the connection is detected, the charging station controller 330 instructs the charging station 130 to charge the EV 110. The charging station controller 330 may also receive a request to stop charging after the EV 110 is sufficiently charged. The charging station controller 330 may instruct the charging station to stop charging in response to the request. The charging station controller 330 may further instruct the actuator of the charger plug 135 to retract the charger plug 135.

The rate module 340 determines energy costs for charging the battery 113. In some embodiments, the rate module 340 retrieves data describing current and future energy costs from an electricity company or another source. In some embodiments, the rate module 340 determines anticipated energy costs over a period of time (e.g., the next 12 hours, the next week, or the next month) based on the current energy cost and historical data stored by the rate module 340 or retrieved from another source. The rate module 340 may determine different anticipated energy costs for multiple different charging stations 130, e.g., charging stations that receive power from different energy companies may have different rates, and a charging station that is fully or partially solar powered may have a lower rate or no fee.

Example Autonomous Alignment Between Charger Plug and Charge Port

Figure 4:
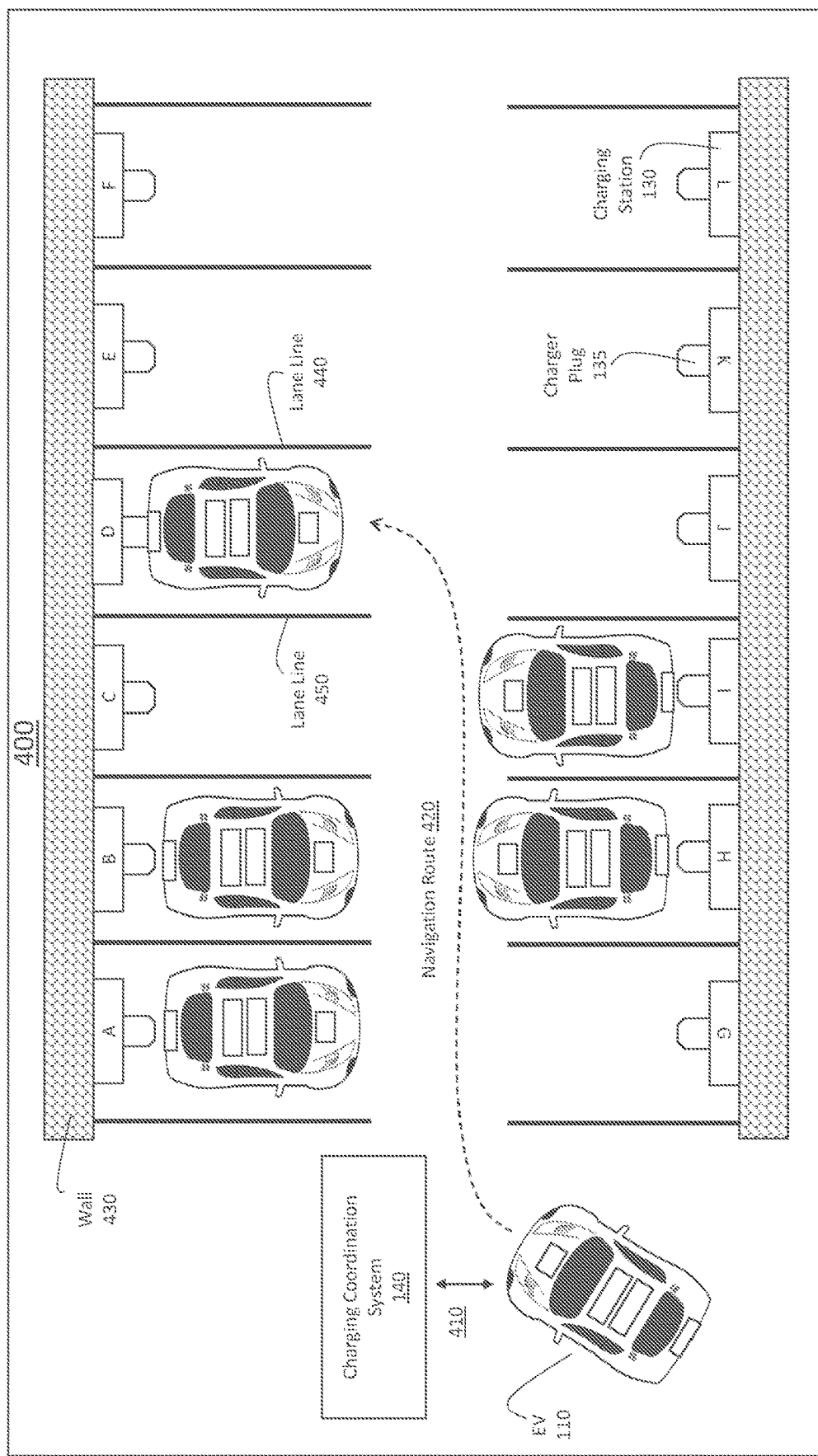
FIG. 4 illustrates autonomous alignment of an EV with a charging station through localization and navigation of the EV in a parking garage according to some embodiments of the present disclosure.

FIG. 4 illustrates autonomous alignment of an EV 110 with a charging station 130 through localization and navigation of the EV 110 in a parking garage 400 according to some embodiments of the present disclosure. The parking garage 400 includes 12 charging stations 130, each of which is located at one of the parking spots A-L. The parking garage also includes a charger coordination system 140 that manages the charging stations 130A-L.

An EV 110 enters the parking garage 400 for charging its battery 113. The EV and the charging coordination system 140 establishes communications through a network 410. The network 140 may be a public or local network. The EV 110 performs its first localization in the parking garage 400. For instance, the EV 110 determines its pose in the parking garage 400 by using its onboard sensor suite 119. The EV 110 then sends a charging request including the pose information to the charger coordination system 140 through the network 410. The charging request may also include one or more charging parameters generated by the onboard controller 117 of the EV 110.

The charger coordination system 140 uses the charging request to select a charging station 130 for the EV 110. In some embodiments, the charger coordination system 140 evaluates the available charging stations 130 based on the charging request and information of the charging stations. The charger coordination system 140 may rank the available charging stations 130 based on the evaluation and selects a charging station 130 that has the highest rank. In the embodiment of FIG. 4, the charger coordination system 140 selects the charging station 130D for the EV 110. The charging station 130 is ranked higher than the other available charging stations, i.e., charging stations 130C, 130E, 130F, 130G, 130J, 130K, and 130L, because charging station 130D has the type of charger required by the EV 110 and it is at a parking spot that is easy for the EV 110 to navigate to and park at a pose appropriate for charging. The charging station 130G is ranked lower even though it is closer to the EV 110, because it is harder for the EV 110 to align with the charger plug 135 of the charging station 130G. The charging station 130J is also ranked lower because it does not have the type of charger required by the EV 110, even though it is about the same distance to the EV 110 and it is not harder for the EV 110 to align with the charger plug 135. The charging stations 130E, 130F, 130K, and 130L are ranked lower because they are further from the EV 110.

The charger coordination system 140 sends the location information of the charging station 135D to the EV 110 through the network 410. The EV 110 then navigates to the charging station 130D through the navigation route 420, which may be generated by the onboard controller 117 based on the location information of the charging station 135D. After the EV 110 arrives at the charging station 130D, the EV 110 performs its second localization in the parking garage 400. The EV 110 determines its pose relative to the charging station 130D. In some embodiments, the EV 110 determines its pose relative to the charging station 130D based on sensor data from its onboard sensor suite 119 and surrounding features, such as the wall 430 and lane lines 440 and 450. The EV 110 may also use features not shown in FIG. 4, such as landmarks in the parking garage 400, markers on the wall 430 or the ground, and so on. The EV 110 uses the determined pose to evaluate its alignment with the charging station 130D, particularly alignment of its charge port 115 with the charger plug 135 of the charging station 130D. The EV 110 may change its pose relative to the charger plug 135 if it is determined that the charge port 115 and the charger plug 135 are not aligned. The EV 110 may move itself or request the charger coordination system 140 to move the charger plug 135.

After the charge port 115 and the charger plug 135 are aligned, the EV 110 may plug itself in by navigating towards the charger plug 135. Additionally or alternatively, the EV 110 requests the charger coordination system 140 to insert the charger plug 135 into the charge port 115. After the EV 110 is plugged in, the charging station 130D charges the EV 110 till a desired charge level of the battery 113 is reached. The EV 110 may then leave the parking garage 400. The charging station 130D becomes available again and may be allocated to another EV 110 entering the parking garage 400.

Example Autonomous Insertion of Charger Plug into Charge Port

Figure 5:
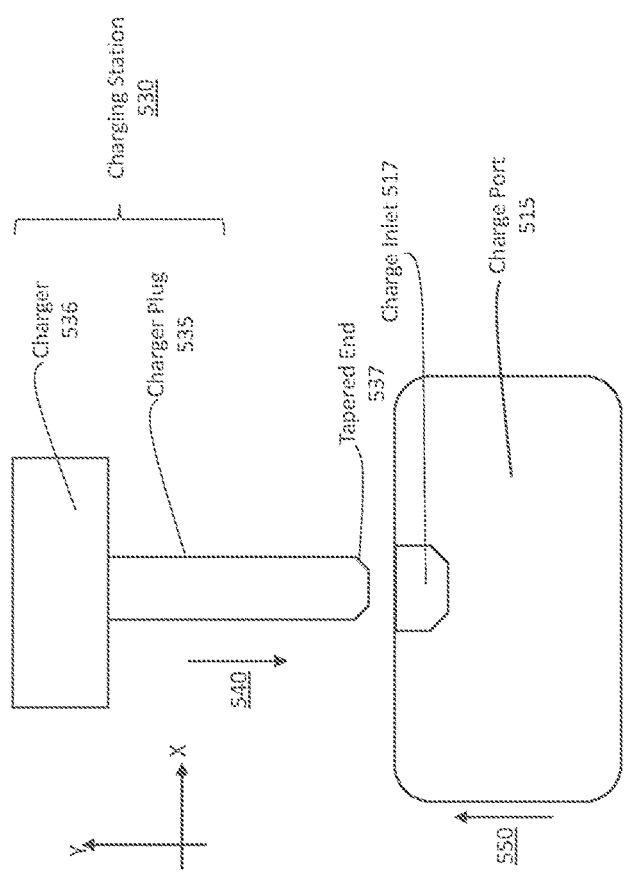
FIG. 5 shows a charger plug of a charging station aligned with a charge port of an EV according to some embodiments of the present disclosure.

FIG. 5 shows a charger plug 535 of a charging station 530 aligned with a charge port 515 of an EV 110 according to some embodiments of the present disclosure. The charging station 530 is an embodiment of the charging station 130, and the charge port 515 is an embodiment of the charge port 115.

The charging station 530 includes the charger plug 535 and a charger 536. The charger 536 may be an AC charger or DC charger. The charger plug has a tapered end 537. The charge port 515 includes a charge inlet 517. The charge inlet 517 has a shape that matches the tapered end 537. The charge inlet 517 can guide the linear motion of the charger plug 535 in the charge port 515. In FIG. 5, the charger plug 535 is aligned with the charge port 515 and can be plugged into the charge port 515 through linear movement of the charger plug 535 along the direction indicated by the arrow 540 or linear movement of the charge port 515 along the direction indicated by the arrow 550. In embodiments where the charger plug 535 and the charge port 515 are not aligned, the charger plug 535 may move relative to the charge port to align with the charge port. The movement of the charge plug 535 may be driven by an actuator controlled by the charge coordination system 140 or by the passive alignment mechanism in the charging station 530. The charge plug 535 may be movable along two perpendicular axes, such as X and Y axes shown in FIG. 5.

Figure 6:
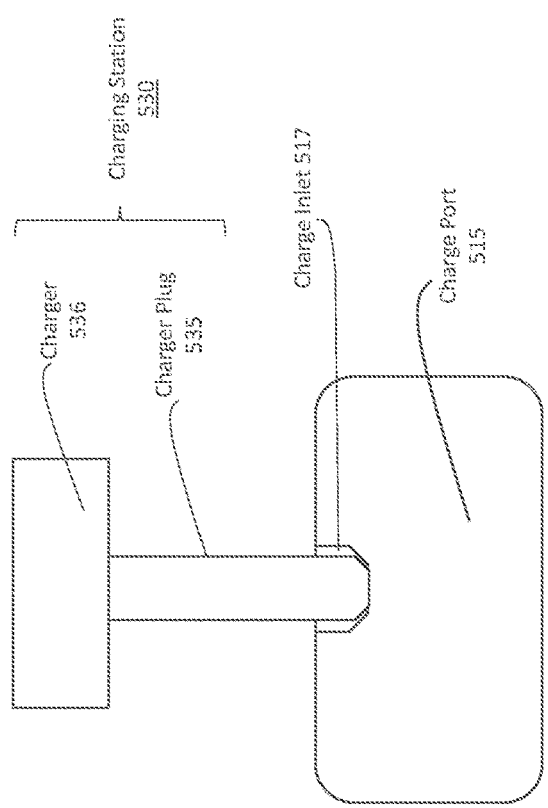
FIG. 6 shows the charger plug plugged into the charge port through linear movement according to some embodiments of the present disclosure.

FIG. 6 shows the charger plug 535 inserted into the charge port 515 through linear movement according to some embodiments of the present disclosure. In FIG. 6, the linear movement of the charger plug 535 or the charge port 515 has finished. The EV 110 is fully plugged in, i.e., the charger plug 535 is connected to the charge port 515. Charging may begin.

FIGS. 7A-B illustrate an actuator 710 that drives linear movement of a charger plug 720 for inserting the charger plug 720 into a charge port 730 according to some embodiments of the present disclosure. The charger plug 720 is an embodiment of the charger plug 135. The charge port 730 is an embodiment of the charge port 115. The actuator 710 includes connecting elements 740A and 740B (collectively referred to as connecting elements 740), actuating elements 750A and 750B (collectively referred to as actuating elements 750), and a shell 760. In other embodiments, the actuator 710 may include fewer, more, or different components. For instance, the actuator 710 may not include the shell 760. As another example, the actuator 710 may include a motor.

The actuating elements 750 moves to drive the linear moment of the charger plug 720. In FIGS. 7A-B, the actuating elements 750 are arranged at opposite sides of the charger plug 720. The actuating elements 750 are pins in the embodiment of FIGS. 7A-B. The connecting elements 740 connect the charger plug 720 to the actuating elements 750. The connecting elements 740 are arranged at opposite sides of the charger plug 720. The connecting elements 740 have a crescent shape, with the arc side of the crescent shape touching an end of each of the actuating elements 750 and opposite ends of the charger plug 720. In other embodiments, the connecting elements 740 or actuating elements 750 may have other shapes.

In an example process of inserting the charger plug 720 into the charge port 730, the actuating elements 750 moves along the direction shown by the arrows 755A-B in FIG. 7B. For instance, the movement of the actuating elements 750 may be driven by a motor. The movement of the actuating elements 750 causes the connecting elements 740 to rotate. The rotation of the connecting elements 740 are shown by the arrows 745A-B. The rotation of the connecting elements 740 drives the linear movement of the charger plug 720 towards and into the charge port 730, as shown by the arrow 725 in FIG. 7B. In this example, the actuator 710 initiates the insertion process.

In another example process of inserting the charger plug 720 into the charge port 730, the charge port 730 moves along the direction shown by the arrow 735 in FIG. 7B, e.g., through a movement of the EV 110. The movement of the charge port 730 pushes the actuating elements 750 to move along the direction shown by the arrows 755A-B, the connecting elements 740 to rotate, and further causing the linear movement of the charger plug 720 shown by the arrow 725 in FIG. 7B. In this example, the EV 110 initiates the insertion process. In other examples, the actuator 710 and the EV 110 may initiate the insertion process together. The insertion process can be monitored and controlled by using force sensors on the charger plug or charge port.

Example Force Sensors

Figure 8A:
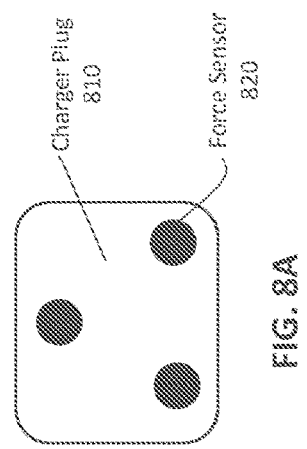
FIGS. 8A-B illustrate force sensors on a charger plug according to some embodiments of the present disclosure.
Figure 8B:
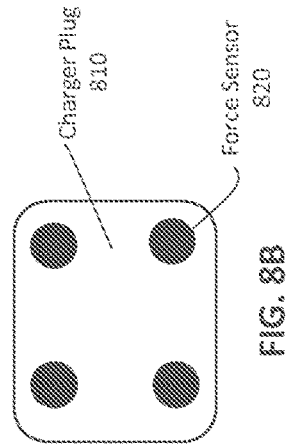

FIGS. 8A-B illustrate force sensors 820 on a charger plug 810 according to some embodiments of the present disclosure. The charger plug 810 is an embodiment of the charger plug 135. The force sensors 820 are on a cross-section of an end of the charger plug 810, i.e., the end of the charger plug 810 that will contact a cross-section of the charge port 115 when the charger plug 810 is fully plugged in. FIG. 8A shows three force sensors that are located at two corners of a side of the cross-section of the charger plug 810 and at the middle of the opposite side of the cross-section. FIG. 8B shows four force sensors that are located at the four corners of the cross-section of the charger plug 810. In other embodiments, the charger plug 810 may have a different number of force sensors. The force sensors 820 detect force applied on them. As the force sensors 820 are located at different portions of the cross-section of the charger plug 810, the force sensors 820 can detect a force distribution on the cross-section of the charger plug 810. The sensor data generated by the force sensor 820 may indicate whether even force is applied to the different portions of the charger plug 810, which further indicate whether the charger plug 810 is aligned with the charge port 115.

Figure 9B:
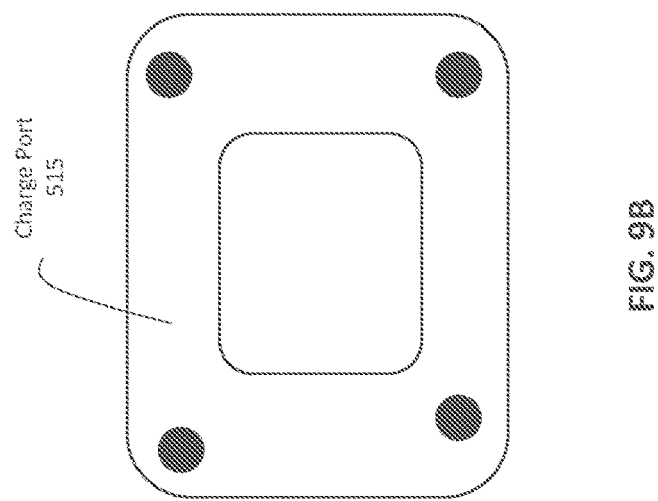
FIGS. 9A-B illustrate force sensors on a charge port according to some embodiments of the present disclosure.
Figure 9A:
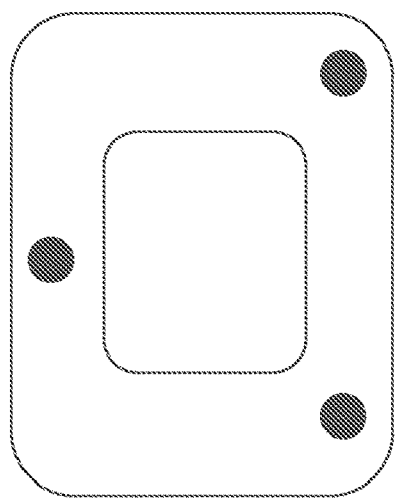

FIGS. 9A-B illustrate force sensors 920 on a charge port 910 according to some embodiments of the present disclosure. The charge port 910 is an embodiment of the charge port 115. The force sensors 920 are on a cross-section of an end of the charge port 910, i.e., the end of the charge port 910 that will contact a cross-section of the charger plug 135 when the charger plug 135 is fully plugged in. FIG. 9A shows three force sensors that are located at two corners of a side of the cross-section of the charge port 910 and at the middle of the opposite side of the cross-section. FIG. 8B shows four force sensors that are located at the four corners of the cross-section. In other embodiments, the charge port 910 may have a different number of force sensors. The force sensors 920 detect force applied on them. As the force sensors 920 are located at different portions of the cross-section of the charge port 910, the force sensors 920 can detect a force distribution on the cross-section. The sensor data generated by the force sensor 920 may indicate whether even force is applied to the different portions of the charge port 910, which further indicate whether the charge port 910 is aligned with the charger plug 135.

Example Charge Port Doors

Figure 10:
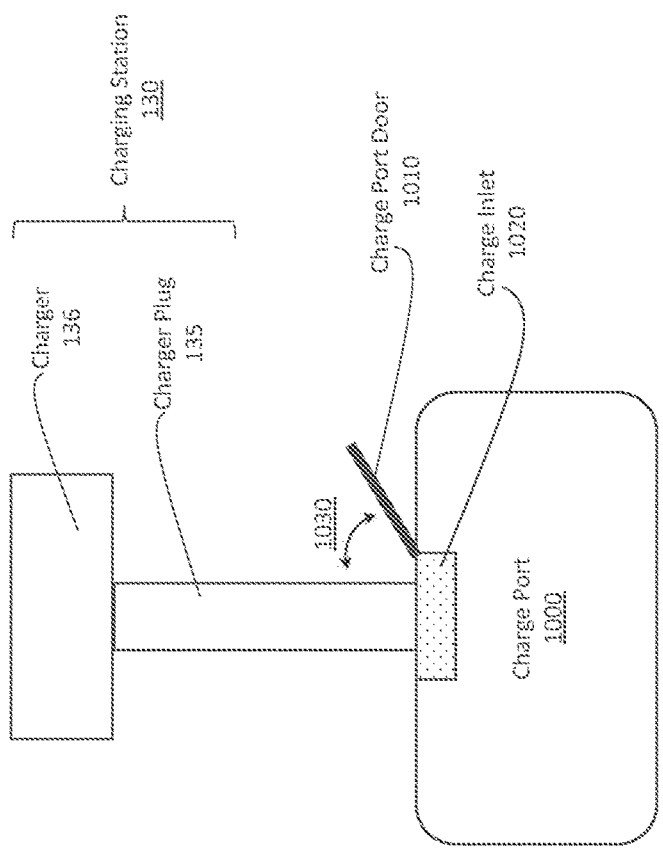
FIG. 10 illustrate a charge port door according to some embodiments of the present disclosure.

FIG. 10 illustrate a charge port door 1010 according to some embodiments of the present disclosure. The charge port door 1010 may be autonomous. The charge port door 1010 is associated with a charge inlet 1020 of a charge port 1000. The charge port 1000 is an embodiment of the charge port 115. The charge port door 1010 provides a cover for the charge inlet 1120 and can be opened and closed autonomously. The charge port door 1010 is coupled to an actuator (not shown in FIG. 10) that drives the charge port door 1010 to rotate along the edge of the charge port door 1010, e.g., through a hinge, where the charge port door 1010 is attached on the charge port 1000. FIG. 10 includes an arrow 1030 showing the directions of the rotational movement of the charge port door 1010. In some embodiments, the onboard controller 117 of the EV 110 instructs the actuator to open the charge port door 1010 when the EV 110 is ready for charging. The onboard controller 117 instructs the actuator to close the charge port door 1010 after charging is done.

Figure 11:
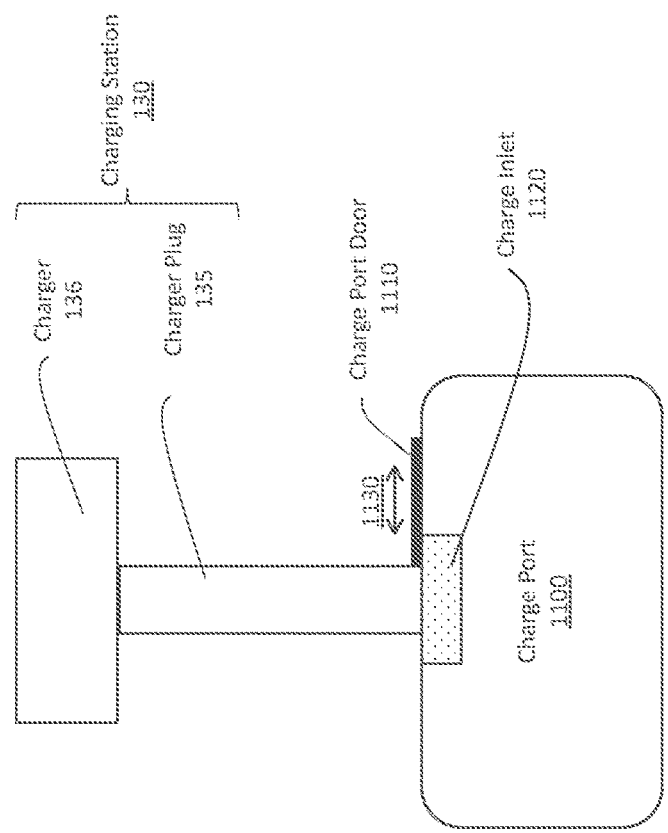
FIG. 11 illustrate another charge port door according to some embodiments of the present disclosure.

FIG. 11 illustrate another charge port door 1110 according to some embodiments of the present disclosure. The charge port door 1110 may be autonomous. The charge port door 1110 is associated with a charge inlet 1120 of a charge port 1100. The charge port 1100 is an embodiment of the charge port 115. The charge port door 1110 provides a cover for the charge inlet 1120 and can be opened and closed autonomously. The charge port door 1110 is coupled to an actuator (not shown in FIG. 11) that drives the charge port door 1110 to slide along a surface of the charge port 1000. FIG. 11 includes an arrow 1130 showing the directions of the linear movement of the charge port door 1010. In some embodiments, the onboard controller 117 of the EV 110 instructs the actuator to open the charge port door 1110 when the EV 110 is ready for charging. The onboard controller 117 instructs the actuator to close the charge port door 1110 after charging is done. FIGS. 10 and 11 show two examples of charge port doors that can be used for autonomous charging. Other designs of charge ports doors may also be used.

Example Processes for Autonomous Charging

Figure 12:
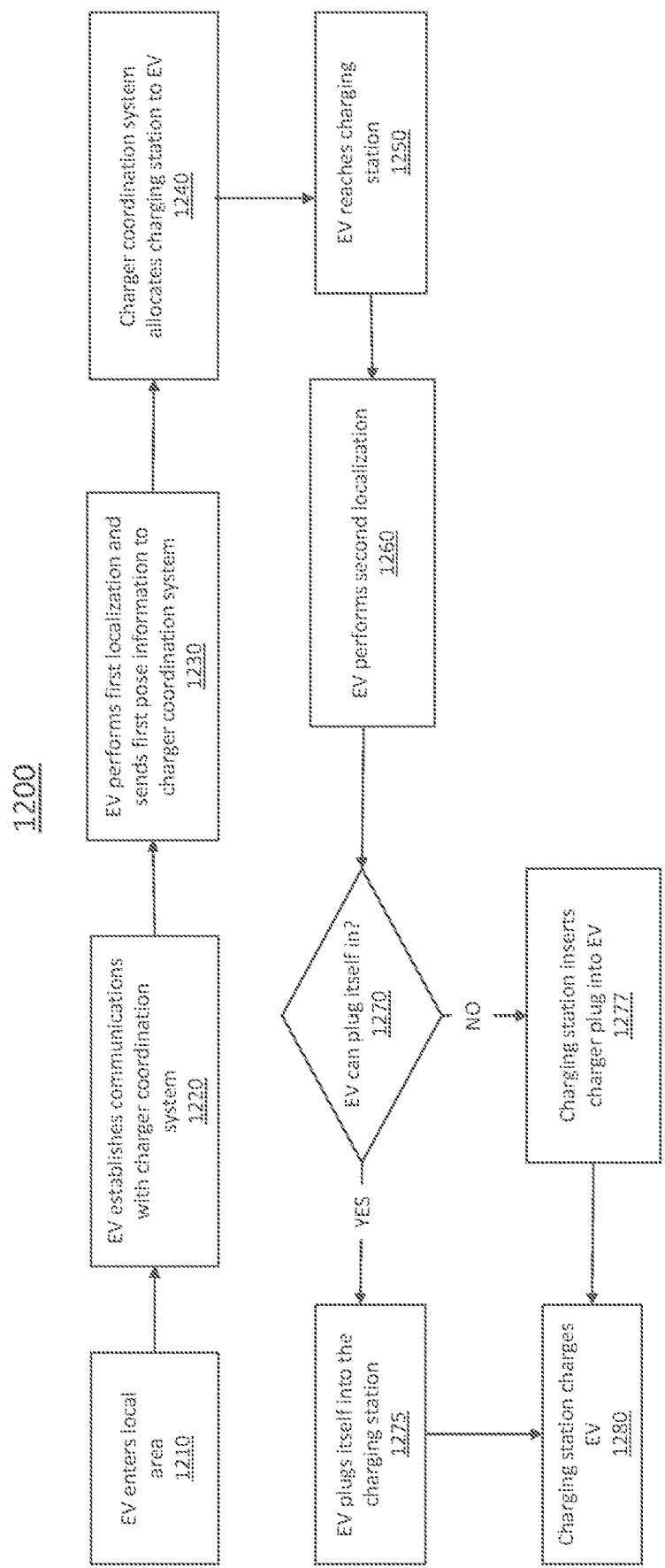
FIG. 12 is a flowchart showing a process for autonomously charging an EV according to some embodiments of the present disclosure.

FIG. 12 is a flowchart showing a process for autonomously charging an EV 110 according to some embodiments of the present disclosure. The EV 110 enters 1210 a local area, such as a garage, where charging stations 130 are located. The EV 110 establishes 1220 communications with a charger coordination system, e.g., the charger coordination system 140, that manages the charging stations 130. The EV 110 performs 1230 a first localization and sends 1230 first pose information to the charger coordination system 140. The first pose information describes a pose of the EV 110 in the local area. The charger coordination system 140 allocates 1240 a charging station 130 to the EV 110 based on the first pose information. The charger coordination system 140 may also send location information of the charging station 130 to the EV 110. The EV 110 reaches 1250 the charging station 130. The EV 110 performs 1260 the second localization and sends 1260 second pose information to the charger coordination system 140. The second pose information describes a pose of the EV relative to the charging station. The EV 110 determines 1270 whether it can plug itself in. If the EV 110 can plug itself in, the EV 110 plugs 1275 itself into the charging station 130. If the EV cannot plug itself in, the charging station 130 plugs 1277 the charger plug 135 into the EV 110. For instance, the charger plug moves to a position where it is aligned with a charge port of the EV 110 and further moves to insert into the charge port. After the EV 110 is plugged in, either by itself or through movement of the charger plug, the charging station 130 charges 1280 the EV 110.

Select Examples

Example 1 provides a method for autonomously charging a vehicle, the method including generating first pose information of the vehicle, the first pose information including information describing a pose of the vehicle with respect to a local area; establishing communications with a charger coordination system associated with the local area; receiving, from the charger coordination system, location information of a charger in the local area; determining a navigation route for navigating the vehicle to the charger based on the first pose information and the location information of the charger; subsequent to arrival of the vehicle at the charger, generating second pose information of the vehicle, the second pose information describing a pose of the vehicle with respect to a charger plug on the charger; and actuating at least one of the vehicle and the charger plug to insert the charger plug into the vehicle based on the second pose information.

Example 2 provides the method according to example 1, where generating the first pose information of the vehicle includes retrieving sensor data generated by a sensor suite of the vehicle; detecting an entry of the vehicle into the local area; in responsive to detecting the entry, accessing a three-dimensional (3D) model of the local area; and generating the first pose information of the vehicle based on the 3D model of the local area and the sensor data.

Example 3 provides the method according to example 2, where the sensor suite includes sensors selected from a group including photodetectors, cameras, RADAR, Sound Navigation And Ranging (SONAR), Light Detection and Ranging (LIDAR), Global Positioning System (GPS), wheel speed sensors, inertial measurement units (IMUS), accelerometers, microphones, ultrasonic sensors, and ambient light sensors.

Example 4 provides the method according to example 2 or 3, where detecting the entry of the vehicle into the local area includes detecting that the vehicle is in the local area based on the sensor data.

Example 5 provides the method according to any of examples 2-4, where establishing the communications with the charger coordination system associated with the local area includes in response to detecting the entry, sending a communicating request to the charging station coordination.

Example 6 provides the method according to any of the preceding examples, where receiving, from the charger coordination system, the location information of the charging station includes sending a charging request from the vehicle to the charger coordination system, the charging request including the first pose information of the vehicle; and in response to the charging request, receiving, from the charger coordination system, the location information of the charging station.

Example 7 provides the method according to example 6, where the charger coordination system is configured to select the charging station from a plurality of charging stations based on the charging request and the location information of the charging station.

Example 8 provides the method according to example 6 or 7, where the charging request further comprises a charging parameter; the charging parameter is charging rate, charger type, charging method, charge level, or some combination thereof; and the charger coordination system is configured to select the charging station from a plurality of charging stations based on the charging request.

Example 9 provides the method according to any of the preceding examples, where generating the second pose information of the vehicle includes generating the second pose information based on one or more features associated with the charging station.

Example 10 provides the method according to example 9, where the one or more features associated with the charging station include a wall, a lane marker, a fiducial marker, a sign, a post, a rail, a landmark, or some combination thereof.

Example 11 provides the method according to any of the preceding examples, where actuating at least one of the vehicle and the charger plug to insert the charger plug into the vehicle based on the second pose information includes determining, based on the second pose information, whether a charge port of the vehicle and the charger plug are aligned; and in response to determining that the charge port and the charger plug are aligned, actuating the vehicle to plug the charger plug into the charge port.

Example 12 provides the method according to example 11, where actuating the vehicle to plug the charger plug into the charge port includes receiving data generated by one or more force sensors on the charge port; analyzing force distribution on the charge port based on the received data; and adjusting the pose of the vehicle relative to the charger plug based on the force distribution.

Example 13 provides the method according to example 12, where there are three or more force sensors on the charge port.

Example 14 provides the method according to any of the preceding examples, where actuating at least one of the vehicle and the charger plug to insert the charger plug into the vehicle based on the second pose information includes determining, based on the second pose information, whether a charge port of the vehicle and the charger plug are aligned; and in response to determining that the charge port and the charger plug are not aligned, sending an actuation request to the charger coordination system based on the second pose information to request the charger coordination system to move the charger plug to align the charger plug with the charge port.

Example 15 provides the method according to any of the preceding examples, where actuating at least one of the vehicle and the charger plug to insert the charger plug into the vehicle based on the second pose information includes determining, based on the second pose information, whether a charge port of the vehicle and the charger plug are aligned; in response to determining that the charge port and the charger plug are not aligned, determining whether the charge port and the charger plug can be aligned by a passive alignment mechanism associated with the charger plug; and in response to determining that the charge port and the charger plug can be aligned by the passive alignment mechanism associated with the charger plug, navigating the vehicle to insert the charger plug into the charge port.

Example 16 provides the method according to any of the preceding examples, where actuating at least one of the vehicle and the charger plug to insert the charger plug into the vehicle based on the second pose information includes actuating a charge port door on the vehicle to expose a charge port to the charger plug.

Example 17 provides the method according to any of the preceding examples, the method further including detecting a connection of the charger plug with a charge port of the vehicle; and in response to detecting the connection, instructing the charger coordination system to start charging the vehicle.

Example 18 provides the method according to any of the preceding examples, the method further including determining whether the vehicle has been charged to a target level; and in response to determining that the vehicle has been charged to the target level, instructing the charger coordination system to stop charging the vehicle.

Example 19 provides the method according to example 18, the method further including actuating a charge port door on the vehicle to cover a charge port of the vehicle.

Example 20 provides one or more non-transitory computer-readable media storing instructions executable to perform operations, the operations including generating first pose information of the vehicle, the first pose information including information describing a pose of the vehicle with respect to a local area; establishing communications with a charger coordination system associated with the local area; receiving, from the charger coordination system, location information of a charger in the local area; determining a navigation route for navigating the vehicle to the charger based on the first pose information and the location information of the charger; subsequent to arrival of the vehicle at the charger, generating second pose information of the vehicle, the second pose information describing a pose of the vehicle with respect to a charger plug on the charger; and actuating at least one of the vehicle and the charger plug to insert the charger plug into the vehicle based on the second pose information.

Example 21 provides a method for autonomously charging a vehicle, the method including establishing communications with the vehicle; receiving a charging request from the vehicle, the charging request including a first pose information of the vehicle, the first pose information of the vehicle including information describing a pose of the vehicle with respect to a local area; identifying a charging station in the local area based on the first pose information of the vehicle; sending location information of the charging station to the vehicle; after sending the location information, receiving second pose information of the vehicle, the second pose information describing a pose of the vehicle with respect to a charger plug of the charging station; and instructing the charging station to charge the vehicle in accordance with the second pose information of the vehicle.

Example 22 provides the method according to example 21, where instructing the charging station to charge the vehicle in accordance with the second pose information of the vehicle includes determining whether a charge port of the vehicle and a charger plug of the charging station are aligned based on the second pose information; and in response to determining that determining that the charge port and charger plug are not aligned, changing a pose of the charger plug to align the charger plug with the charge port Example 23 provides the method according to example 22, where changing a pose of the charger plug to align the charger plug with the charge port includes changing a position of the charger plug in relative to the charging port by using an actuator associated with the charger plug.

Example 24 provides the method according to example 23, where the actuator includes two actuating elements and two connecting elements, an individual connecting element of the two connecting elements connects an individual actuating element of the two actuating elements to the charger plug, a movement of the individual actuating element drives the individual connecting element to rotate, and a rotation of the individual connecting element drives the charger plug to move.

Example 25 provides the method according to any of examples 22-24, where changing a pose of the charger plug to align the charger plug with the charge port includes receiving data generated by one or more force sensors on the charger plug; analyzing force distribution on the charger plug based on the received data; determining an actuation orientation based on the force distribution; and changing the pose of the charger plug in accordance with the actuation orientation.

Example 26 provides the method according to example 25, where there are three or more force sensors on the charger plug.

Example 27 provides the method according to any of examples 21-26, where instructing the charging station to charge the vehicle in accordance with the second pose information of the vehicle includes determining, based on the second pose information, whether a charge port of the vehicle and a charger plug of the charging station are aligned; in response to determining that the charge port and charger plug are aligned, detecting a connection between the charger plug and the charge port; and in response to detecting the connection between the charger plug and the charge port, instructing the charging station to charge the vehicle.

Example 28 provides the method according to any of examples 21-27, where identifying a plurality of charging stations in the local area; determining availability of the plurality of charging stations in the local area; and selecting the charging station from the plurality of charging stations based on the first pose information of the vehicle and the availability of the plurality of charging stations.

Example 29 provides the method according to example 28, where the charging request includes information indicating an amount of power needed by the vehicle, and determining the availability of the plurality of charging stations in the local area includes detecting charge levels of the plurality of charging stations; and determining the availability of the plurality of charging stations in the local area based on the amount of power needed by the vehicle and the charge levels of the plurality of charging stations.

Example 30 provides the method according to any of examples 21-29, the method further including receiving a request to stop charging from the vehicle; and in response to the request, instructing the charging station to stop charging.

Example 31 provides one or more non-transitory computer-readable media storing instructions for autonomously charging a vehicle, the instructions, when executed by a processor, cause the processor to perform operations including establishing communications with the vehicle; receiving a charging request from the vehicle, the charging request including a first pose information of the vehicle, the first pose information of the vehicle including information describing a pose of the vehicle with respect to a local area; identifying a charging station in the local area based on the first pose information of the vehicle; sending location information of the charging station to the vehicle; after sending the location information, receiving second pose information of the vehicle, the second pose information describing a pose of the vehicle with respect to a charger plug of the charging station; and instructing the charging station to charge the vehicle in accordance with the second pose information of the vehicle.

Example 32 provides the one or more non-transitory computer-readable media according to example 31, where the instructions for instructing the charging station to charge the vehicle in accordance with the second pose information of the vehicle comprise instructions, when executed by the processor, cause the processor to perform operations including determining whether a charge port of the vehicle and a charger plug of the charging station are aligned based on the second pose information; and in response to determining that the charge port and charger plug are not aligned, changing a pose of the charger plug to align the charger plug with the charge port.

Example 33 provides the one or more non-transitory computer-readable media according to example 32, where the instructions for changing a pose of the charger plug to align the charger plug with the charge port comprise instructions, when executed by the processor, cause the processor to perform operations including changing a position of the charger plug in relative to the charging port by using an actuator associated with the charger plug, where the actuator includes two pins and two connecting elements, an individual connecting element of the two connecting elements connects an individual pin of the two pins to the charger plug, a movement of the individual pin drives the individual connecting element to rotate, and a rotation of the individual connecting element drives the charger plug to move.

Example 34 provides the one or more non-transitory computer-readable media according to any of examples 31-33, where the instructions for instructing the charging station to charge the vehicle in accordance with the second pose information of the vehicle comprise instructions, when executed by the processor, cause the processor to perform operations including determining, based on the second pose information, whether a charge port of the vehicle and a charger plug of the charging station are aligned; in response to determining that the charge port and charger plug are aligned, detecting a connection between the charger plug and the charge port; and in response to detecting the connection between the charger plug and the charge port, instructing the charging station to charge the vehicle.

Example 35 provides the one or more non-transitory computer-readable media according to examples 31-34, where the instructions for identifying the charging station in the local area based on the first pose information of the vehicle comprise instructions, when executed by the processor, cause the processor to perform operations including identifying a plurality of charging stations in the local area; determining availability of the plurality of charging stations in the local area; and selecting the charging station from the plurality of charging stations based on the first pose information of the vehicle and the availability of the plurality of charging stations.

Example 36 provides the one or more non-transitory computer-readable media according to example 35, where the charging request includes information indicating an amount of power needed by the vehicle, and the instructions for determining the availability of the plurality of charging stations in the local area comprise instructions, when executed by the processor, cause the processor to perform operations including detecting charge levels of the plurality of charging stations; and determining the availability of the plurality of charging stations in the local area based on the amount of power needed by the vehicle and the charge levels of the plurality of charging stations.

Example 37 provides the one or more non-transitory computer-readable media according to any of examples 31-36, where the instructions when executed by the processor, further cause the processor to perform operations including receiving a request to stop charging from the vehicle; and in response to the request, instructing the charging station to stop charging.

Example 38 provides a computer-implemented system for autonomously charging a vehicle, the system including a processor; and one or more non-transitory computer-readable media storing instructions for autonomously charging the vehicle, the instructions, when executed by the processor, cause the processor perform operations including establishing communications with the vehicle; receiving a charging request from the vehicle, the charging request including a first pose information of the vehicle, the first pose information of the vehicle including information describing a pose of the vehicle with respect to a local area; identifying a charging station in the local area based on the first pose information of the vehicle; sending location information of the charging station to the vehicle; after sending the location information, receiving second pose information of the vehicle, the second pose information describing a pose of the vehicle with respect to a charger plug of the charging station; and instructing the charging station to charge the vehicle in accordance with the second pose information of the vehicle.

Example 39 provides the computer-implemented system of example 38, where instructing the charging station to charge the vehicle in accordance with the second pose information of the vehicle includes determining whether a charge port of the vehicle and a charger plug of the charging station are aligned based on the second pose information; and in response to determining that the charge port and charger plug are not aligned, changing a pose of the charger plug to align the charger plug with the charge port.

Example 40 provides the computer-implemented system of example 38, where identifying the charging station in the local area based on the first pose information of the vehicle includes identifying a plurality of charging stations in the local area; determining availability of the plurality of charging stations in the local area; and selecting the charging station from the plurality of charging stations based on the first pose information of the vehicle and the availability of the plurality of charging stations.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method for autonomously charging a vehicle, the method comprising:
   receiving, by a charger coordination system associated with a local area, a communicating request from the vehicle, the charger coordination system managing one or more charging stations in the local area;
   establishing, by the charger coordination system, communications with the vehicle based on the communicating request;
   receiving, by the charger coordination system from the vehicle, a charging request, the charging request comprising a first pose information of the vehicle, the first pose information of the vehicle comprising information describing a pose of the vehicle with respect to the local area;

identifying, by the charger coordination system, a charging station from the one or more charging stations in the local area based on the first pose information of the vehicle;

sending, by the charger coordination system to the vehicle, location information of the charging station;

after sending the location information, receiving, by the charger coordination system, second pose information of the vehicle, the second pose information describing a pose of the vehicle with respect to a charger plug of the charging station; and instructing, by the charger coordination system, the charging station to charge the vehicle in accordance with the second pose information of the vehicle.

2. The method of claim 1, wherein instructing the charging station to charge the vehicle in accordance with the second pose information of the vehicle comprises:

determining whether a charge port of the vehicle and a charger plug of the charging station are aligned based on the second pose information; and in response to determining that the charge port and charger plug are not aligned, changing a pose of the charger plug to align the charger plug with the charge port.

3. The method of claim 2, wherein changing a pose of the charger plug to align the charger plug with the charge port comprises:

changing a position of the charger plug in relative to the charging port by using an actuator associated with the charger plug.

4. The method of claim 3, wherein the actuator includes two actuating elements and two connecting elements, an individual connecting element of the two connecting elements connects an individual actuating element of the two actuating elements to the charger plug, a movement of the individual actuating element drives the individual connecting element to rotate, and a rotation of the individual connecting element drives the charger plug to move.

5. The method of claim 2, wherein changing a pose of the charger plug to align the charger plug with the charge port comprises:

receiving data generated by one or more force sensors on the charger plug;

analyzing force distribution on the charger plug based on the received data;

determining an actuation orientation based on the force distribution; and changing the pose of the charger plug in accordance with the actuation orientation.

6. The method of claim 5, wherein there are three or more force sensors on the charger plug.

7. The method of claim 1, wherein instructing the charging station to charge the vehicle in accordance with the second pose information of the vehicle comprises:

determining, based on the second pose information, whether a charge port of the vehicle and a charger plug of the charging station are aligned;

in response to determining that the charge port and charger plug are aligned, detecting a connection between the charger plug and the charge port; and in response to detecting the connection between the charger plug and the charge port, instructing the charging station to charge the vehicle.

8. The method of claim 1, wherein identifying the charging station in the local area based on the first pose information of the vehicle comprises:

identifying a plurality of charging stations in the local area;

determining availability of the plurality of charging stations in the local area; and selecting the charging station from the plurality of charging stations based on the first pose information of the vehicle and the availability of the plurality of charging stations.

9. The method of claim 8, wherein the charging request comprises information indicating a charge level, and determining the availability of the plurality of charging stations in the local area comprises:

detecting charge levels of the plurality of charging stations; and determining the availability of the plurality of charging stations in the local area based on the charge level and the charge levels of the plurality of charging stations.

10. The method of claim 1, further comprising:

receiving a request to stop charging from the vehicle; and in response to the request, instructing the charging station to stop charging.

11. One or more non-transitory computer-readable media storing instructions for autonomously charging a vehicle, the instructions, when executed by a processor, cause the processor to perform operations comprising:

receiving, by a charger coordination system associated with a local area, a communicating request from the vehicle, the charger coordination system managing one or more charging stations in the local area;

establishing, by the charger coordination system, communications with the vehicle based on the communicating request;

receiving, by the charger coordination system from the vehicle, a charging request, the charging request comprising a first pose information of the vehicle, the first pose information of the vehicle comprising information describing a pose of the vehicle with respect to the local area;

identifying, by the charger coordination system, a charging station from the one or more charging stations in the local area based on the first pose information of the vehicle;

sending, by the charger coordination system to the vehicle, location information of the charging station;

after sending the location information, receiving, by the charger coordination system, second pose information of the vehicle, the second pose information describing a pose of the vehicle with respect to a charger plug of the charging station; and instructing, by the charger coordination system, the charging station to charge the vehicle in accordance with the second pose information of the vehicle.

12. The one or more non-transitory computer-readable media of claim 11, wherein the instructions for instructing the charging station to charge the vehicle in accordance with the second pose information of the vehicle comprise instructions, when executed by the processor, cause the processor to perform operations comprising:

determining whether a charge port of the vehicle and a charger plug of the charging station are aligned based on the second pose information; and in response to determining that the charge port and charger plug are not aligned, changing a pose of the charger plug to align the charger plug with the charge port.

13. The one or more non-transitory computer-readable media of claim 12, wherein the instructions for changing a pose of the charger plug to align the charger plug with the charge port comprise instructions, when executed by the processor, cause the processor to perform operations comprising:
  changing a position of the charger plug in relative to the charging port by using an actuator associated with the charger plug,
  wherein the actuator includes two pins and two connecting elements, an individual connecting element of the two connecting elements connects an individual pin of the two pins to the charger plug, a movement of the individual pin drives the individual connecting element to rotate, and a rotation of the individual connecting element drives the charger plug to move.

14. The one or more non-transitory computer-readable media of claim 11, wherein the instructions for instructing the charging station to charge the vehicle in accordance with the second pose information of the vehicle comprise instructions, when executed by the processor, cause the processor to perform operations comprising:
  determining, based on the second pose information, whether a charge port of the vehicle and a charger plug of the charging station are aligned;
  in response to determining that the charge port and charger plug are aligned, detecting a connection between the charger plug and the charge port; and
  in response to detecting the connection between the charger plug and the charge port, instructing the charging station to charge the vehicle.

15. The one or more non-transitory computer-readable media of claim 11, wherein the instructions for identifying the charging station in the local area based on the first pose information of the vehicle comprise instructions, when executed by the processor, cause the processor to perform operations comprising:
  identifying a plurality of charging stations in the local area;
  determining availability of the plurality of charging stations in the local area; and
  selecting the charging station from the plurality of charging stations based on the first pose information of the vehicle and the availability of the plurality of charging stations.

16. The one or more non-transitory computer-readable media of claim 15, wherein the charging request comprises information indicating a charge level, and the instructions for determining the availability of the plurality of charging stations in the local area comprise instructions, when executed by the processor, cause the processor to perform operations comprising:
  detecting charge levels of the plurality of charging stations; and
  determining the availability of the plurality of charging stations in the local area based on the charge level and the charge levels of the plurality of charging stations.

17. The one or more non-transitory computer-readable media of claim 11, wherein the instructions when executed by the processor, further cause the processor to perform operations comprising:
  receiving a request to stop charging from the vehicle; and
  in response to the request, instructing the charging station to stop charging.

18. A computer-implemented system for autonomously charging a vehicle, the computer-implemented system comprising:
  a processor; and
  one or more non-transitory computer-readable media storing instructions for autonomously charging the vehicle, the instructions, when executed by the processor, cause the processor perform operations comprising:
    receiving, by a charger coordination system associated with a local area, a communicating request from the vehicle, the charger coordination system managing one or more charging stations in the local area;
    establishing, by the charger coordination system, communications with the vehicle based on the communicating request;
    receiving, by the charger coordination system from the vehicle, a charging request, the charging request comprising a first pose information of the vehicle, the first pose information of the vehicle comprising information describing a pose of the vehicle with respect to the local area;
    identifying, by the charger coordination system, a charging station from the one or more charging stations in the local area based on the first pose information of the vehicle;
    sending, by the charger coordination system to the vehicle, location information of the charging station;
    after sending the location information, receiving, by the charger coordination system, second pose information of the vehicle, the second pose information describing a pose of the vehicle with respect to a charger plug of the charging station; and
    instructing, by the charger coordination system, the charging station to charge the vehicle in accordance with the second pose information of the vehicle.

19. The computer-implemented system of claim 18, wherein instructing the charging station to charge the vehicle in accordance with the second pose information of the vehicle comprises:
  determining whether a charge port of the vehicle and a charger plug of the charging station are aligned based on the second pose information; and
  in response to determining that the charge port and charger plug are not aligned, changing a pose of the charger plug to align the charger plug with the charge port.

20. The computer-implemented system of claim 18, wherein identifying the charging station in the local area based on the first pose information of the vehicle comprises:
  identifying a plurality of charging stations in the local area;
  determining availability of the plurality of charging stations in the local area; and selecting the charging station from the plurality of charging stations based on the first pose information of the vehicle and the availability of the plurality of charging stations.

* * * * *